Feb. 14, 1956  B. E. STENTZ ET AL  2,734,826
METHOD OF AND APPARATUS FOR STERILIZING INFANTS' FORMULA
Filed Aug. 30, 1952  4 Sheets-Sheet 1

INVENTORS
Blair E. Stentz
George C. Weingardt
BY
Owen & Owen
ATTYS.

INVENTORS
Blair E. Stentz
George C. Weingardt
BY Owen & Owen
ATTYS.

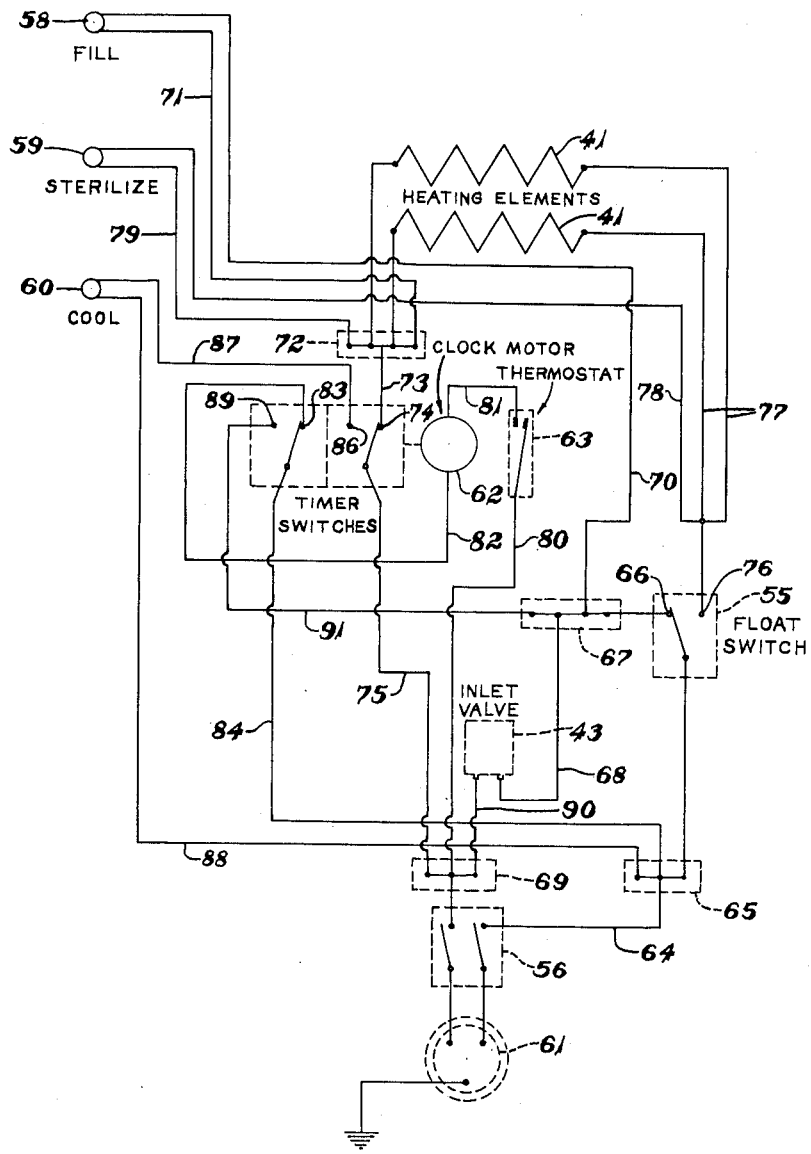

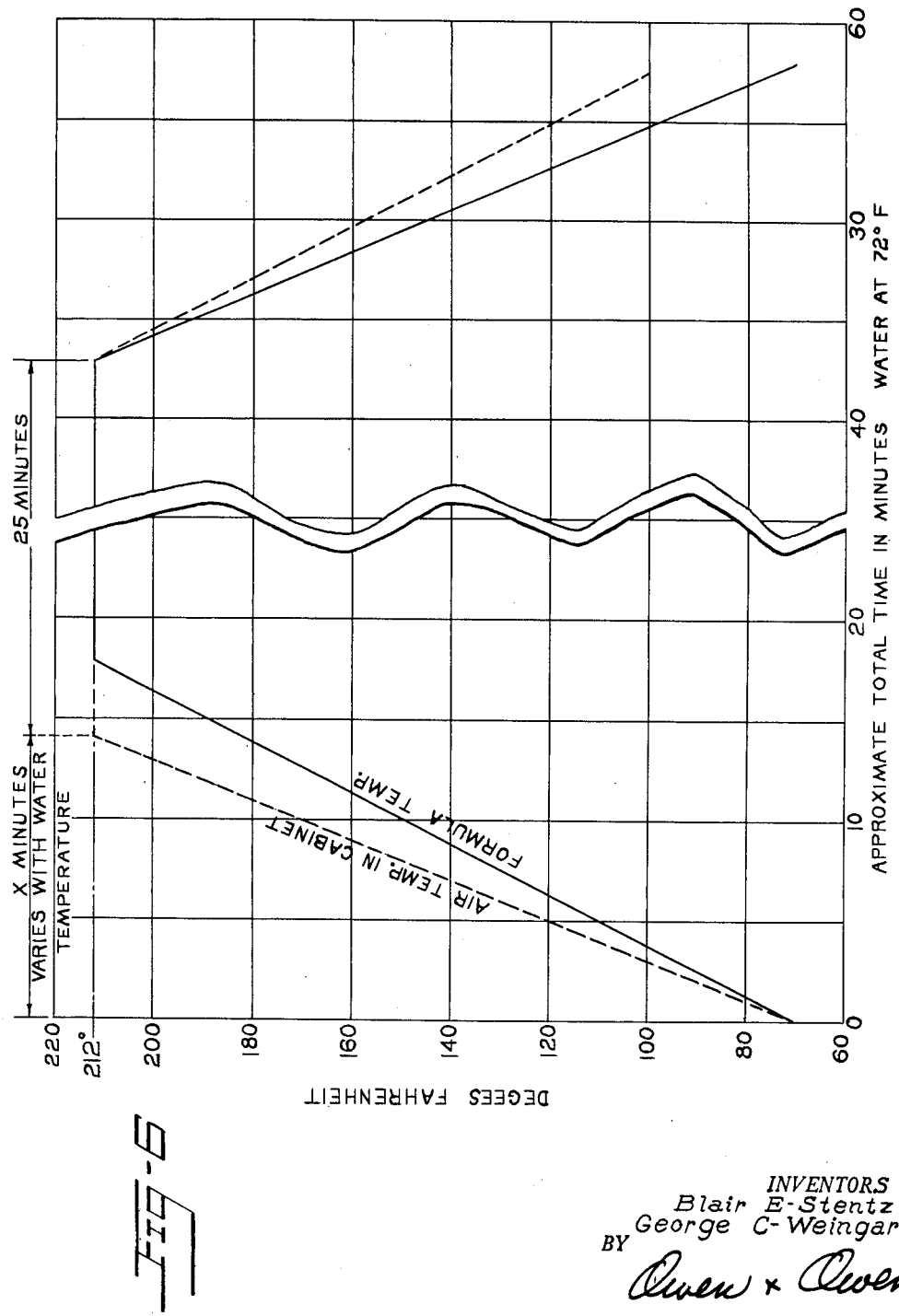

United States Patent Office 2,734,826
Patented Feb. 14, 1956

2,734,826

METHOD OF AND APPARATUS FOR STERILIZING INFANTS' FORMULA

Blair E. Stentz and George C. Weingardt, Toledo, Ohio, assignors to The Swartzbaugh Manufacturing Company, Toledo, Ohio, a corporation of Ohio Application August 30, 1952, Serial No. 307,342

4 Claims. (Cl. 99—212)

This invention relates to a method of and apparatus for the sterilization of infants' formula after the formula has been measured into the nippled bottles from which the infants eat the formula.

The sterilization of infant formula in hospitals has presented a problem for many years. Investigators have studied practices employed as, for example, heating the formula by immersing bottles in two to three inches of boiling water for 20 minutes, and in some instances, reputable and acknowledge experts have been of the opinion that procedures of this type were unsatisfactory and frequently were important factors in the transmission of epidemic diarrhea among infants. Indeed, in at least one reported test where infant diarrhea was present, the investigators went to the extent of pasteurizing the formula at 148° to 160° F. for 30 minutes and the diarrhea outbreak was conquered (American Journal of Hygiene 33 (Sec. A): 42, 1941).

Although the precise types of bacteria causing infant diarrhea and infant mortalities are not always the same and, in fact, have not been precisely identified, it appears reasonably certain that if a sterilization procedure will eliminate or reduce the count of certain relatively virulent types of bacteria satisfactorily, it also will either eliminate or reduce to a safe level the numbers of other bacteria of these general types and will render formula so treated safe for infant consumption.

In an effort to achieve satisfactory sterilization of infant formula several types of apparatus have been employed. One of the systems adopted and relatively widely used involves the employment of an autoclave which is a closed pressure vessel into which live steam is introduced for the purpose of raising the formula to a sterilizing temperature for a length of time sufficient to produce practical sterility. While autoclaves have been used in many scientific and commercial processes with success, their use in hospitals involves several problems, among them the necessity for the continuous presence of a trained person who is required to time the operation with accuracy necessitating the use of a stopwatch. Failure to control the operation this accurately frequently results in caramelization of the formula due to its being raised to too high a temperature or held at such a temperature for too long a period of time. When a batch of formula is caramelized it is wasted, requiring that the entire mixing and sterilizing procedure be repeated and, of course, increasing the cost of operation of that portion of a hospital.

A further difficulty with the autoclave in its use in hospitals results from the fact that the pressure within the vessel must be carefully controlled to avoid the danger of explosion and resulting injury to the operating personnel. Furthermore, the excessive heat and pressure involved in the operation of the device has a deleterious effect upon the formula, breaking down the protein structure and destroying some of the vitamin content.

Other institutions employ the hot water bath system. An open top container is partially filled with water. The infant formula bottles are filled and capped to prevent contamination from the air and placed in the water bath which is brought to a boil. The bath is kept at a boiling temperature for a sufficient length of time to sterilize the formula. This system, being even less accurately controllable than the system employing the autoclave, frequently does not produce dependable results. Furthermore, in this system the nipples and nipple caps are not exposed to sterilizing temperature and thus, if contaminated during the filling process, are not sterilized prior to feeding the infants. As in the case of the autoclave, overboiling results in caramelization and wastage of the formula.

It is, therefore, the principal object of this invention to provide a method for the automatic cyclic sterilization of infant formula in capped, nippled, bottles which includes the sterilization not only of the formula but of the bottles, their nipples and their caps.

It is another object of this invention to provide apparatus which is automatic in its operating cycle and which will repeatedly and successfully completely sterilize infant formula, its containing bottles and the nipples and caps on such bottles.

A still further object of this invention is to provide apparatus for the "terminal sterilization" of infant formula which is automatic in its cycle, whereby an operator merely inserts feeding bottles containing the formula, initiates a cycle, and need pay no more attention to the process; completion of the sterilization cycle being signalled by the device.

It is yet another object of this invention to provide a method of and apparatus for sterilizing infant formula in which no great care need be exercised in maintaining the formula, the bottle, the nipples or the caps sterile durring measuring of the formula and in which all of these elements are successfully sterilized and the bottles delivered after the sterilization cycle in condition for refrigerated storage or for usage without further treatment. It is, of course, understood that this invention is not a substitute for cleanliness and that normal formula room procedures are assumed to be observed.

The method and apparatus constituting the invention will be more clearly understood from reference to the specification which follows and from the drawings in which:

Fig. 5 is a schematic wiring diagram of the control and indication elements employed in an apparatus embodying the invention.

Fig. 6 is a time-temperature chart illustrating the changes in the temperature of the surrounding air and the formula being sterilized in accordance with the instant invention.

The method embodying the invention involves the sterilization of bottles containing infant formula and includes the sterilization not only of the formula but of the bottles, their nipples and their protective caps whereby all of the elements coming into contact with the infants are rendered practically sterile and which method is wholly dependable in its sterilization and in its simple operation. The method contemplates that an operator will measure appropriate quantities of appropriately mixed formula and place the same in containers of conventional style, each holding a quantity appropriate for feeding. The bottles employed are generally referred to as "formula bottles" and have large necks over which soft rubber nipples are placed. The rubber nipples usually are capped with a protective glass cap. The glass cap does not make an air tight seal with the nipple prior to sterilization but is of such size and shape that it can be rather tightly forced downwardly on the nipple after the sterilization is complete.

This preliminary mixing and measuring may be done in any manner and in itself is advantageous over the measuring and mixing of formula for sterilization by prior art methods because no great care need be taken to maintain the bottles, nipples or caps sterile during the steps. A sterilization by means of the invention is so effective that no precautions are necessary in the preliminary work.

Practicing the method of the invention, formula bottles thus filled and prepared are placed in a closed, but not pressure tight container, and water is introduced therein. During the initial introduction period of the water, the length of which varies with the original temperature of the water, the formula temperature rises on a substantially straight line until it reaches just slightly under 212° F., say 208° to 211.5° F. The formula is then held at this temperature for a period of 25 minutes. It is to be understood that the bottles containing the formula are not actually in contact with the hot water but are held in position closely adjacent the pool of water; the steam within the closed but not sealed cabinet being relied upon to heat the bottles and their contents. After the expiration of the 25 minutes sterilizing period cold water is directed into the pool within the cabinet, displacing the hot water.

For example, if a group of 24 four ounce bottles thus prepared is placed in the inner chamber of a closed but not pressure tight device and boiling water is introduced therein, it has been found that approximately 18 to 20 minutes are required to bring the formula up to the sterilizing temperature, say between 208° F. and 211.5° F. After the 25 minute sterilizing period at this elevated temperature substitution of water at normal room temperature for the hot water in the cabinet requires about 15 to 20 minutes to reduce the formula temperature again to room temperature. The formula is then either placed in refrigerators or may be used.

Figure 1:
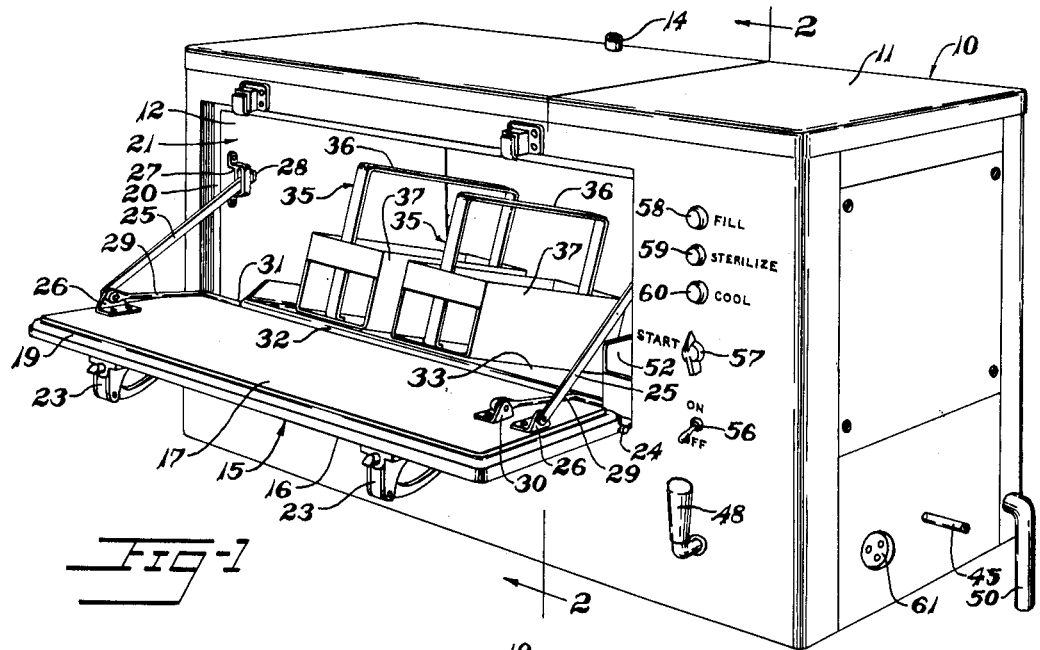
Fig. 1 is a view in perspective of apparatus embodying the invention for the automatic cyclic sterilization of infant formula.

Apparatus specifically designed to permit the carrying out of the previously outline process as an automatic operation and to control the steps of the operation to permit its repetition with uniformly successful results, is disclosed in the drawings and may comprise a cabinet 10 (Fig. 1) having an outer shell 11 and an inner shell 12 with the space therebetween filled with heat insulating material generally indicated at 13. A vent pipe 14 communicates between the interior of the cabinet and the atmosphere. The cabinet 10 has a door 15 hinged along a horizontal hinge line and similarly having an outer panel 16 and inner panel 17 between which a mass of heat insulation 18 is located. The door 15 is provided with a peripheral gasket 19 which contacts an inwardly turned lip 20 at the margins of a door opening 21 leading into an interior chamber 22 defined by the inner casing 12. The door 15 may be provided with one or more latches 23.

The door 15 being mounted on a horizontal hinge 24 is swung downwardly and forwardly when open (the position shown in Figs. 1 and 2) and is limited in its forward travel by a pair of arms 25 pivotally connected to ears 26 on the door 15. The arms 25 slide in guides 27 which are secured to the inner casing 12 and engaged by turned over ends 28 on the arms 25 when the door 15 is lowered to horizontal position.

A second pair of links 29 are similarly secured to one of the ears 26 and a supplementary ear 30 fastened on the inner side of the door 15. The links 29 are integral with or secured to a cross bar 31 which is engaged in a lip 32 formed on the front edge of a bottle carrier tray 33, the rear edge of which may be pivotally supported on a bar 34, for example extending across the rear of the chamber 22. The links 29, bar 31 and bar 34 are so arranged and positioned relative to each other that when the door 15 is swung open to its horizontal position, the tray 33 is elevated at the front to drain any condensed moisture therefrom and to permit an operator easily to slide one or more bottle carriers 35 out through the opening 21 onto the surface of the door 15.

Figure 2:
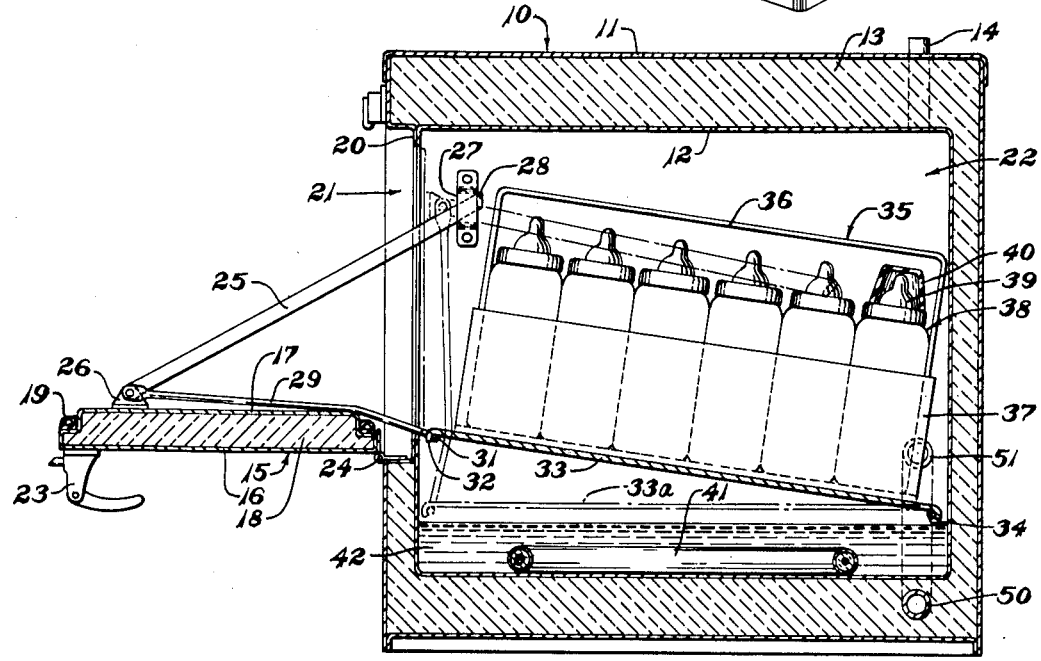
Fig. 2 is an enlarged vertical sectional view taken substantially on the line 2—2 of Fig. 1 and showing a plurality of infant formula bottles in the apparatus.

Each of the bottle carriers 35 is conventional in design having a bail 36 and frame 37 for the reception of a plurality of infant formula bottles generally indicated at 38 in Fig. 2. Each of the infant formula bottles has a nipple 39 which may be covered by a protective glass cover 40 (one being shown in section in Fig. 2).

At the bottom of the chamber 22 there are located one or more heating elements 41 for heating a pool of water generally indicated at 42 in Fig. 2 that is introduced into the bottom of the chamber 22 in the first step of the cycle of operation to be described below after the door 15 has been closed. By apparatus to be described below the level of the pool 42 is kept beneath the level of the carrier 33 at its lowest point, indicated by the reference character 33ª in Fig. 2 during the heating phase of the cycle.

An electrically actuated inlet valve 43 is located in a control compartment 44 at the right side of the casing for controlling the flow of normal temperature water from a source pipe 45 to an inlet pipe 46 which extends into the interior of the chamber 22 near the bottom thereof. A manually actuated drain valve 47 having an actuating handle 48 which protrudes through the front of the cabinet (Fig. 1) is located in a drain line 49 at the front bottom of the chamber 22. The drain line 49 is connected to a drain pipe 50 located at the rear of the cabinet and also is connected to an overflow pipe 51 extending into the interior of the chamber 22 at a level above the lower position of the tray 33.

Figure 3:
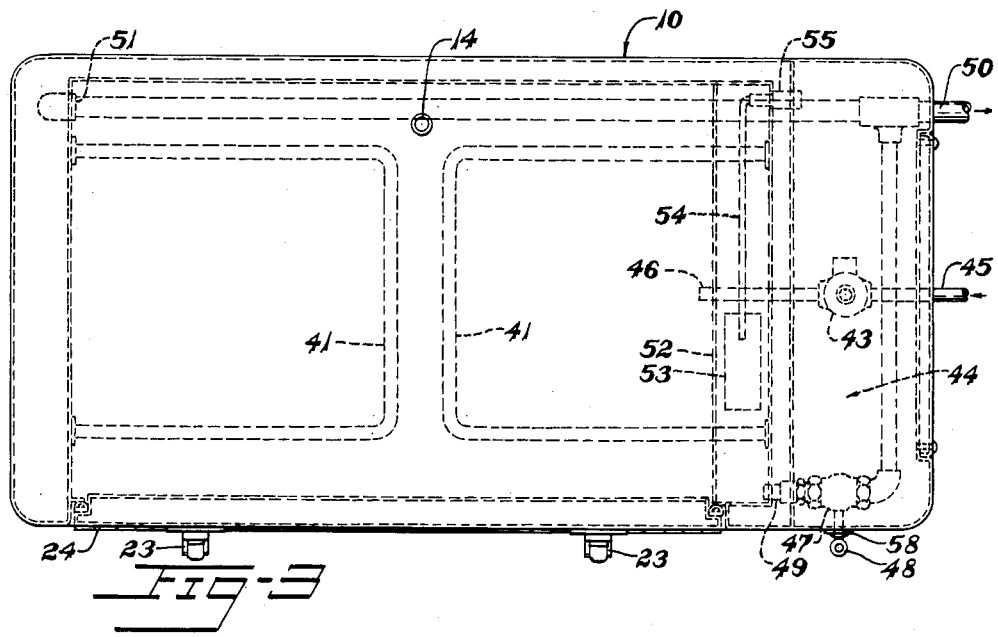
Fig. 3 is a plan view of the apparatus shown in Fig. 1 with certain interior parts thereof indicated in broken line.
Figure 4:
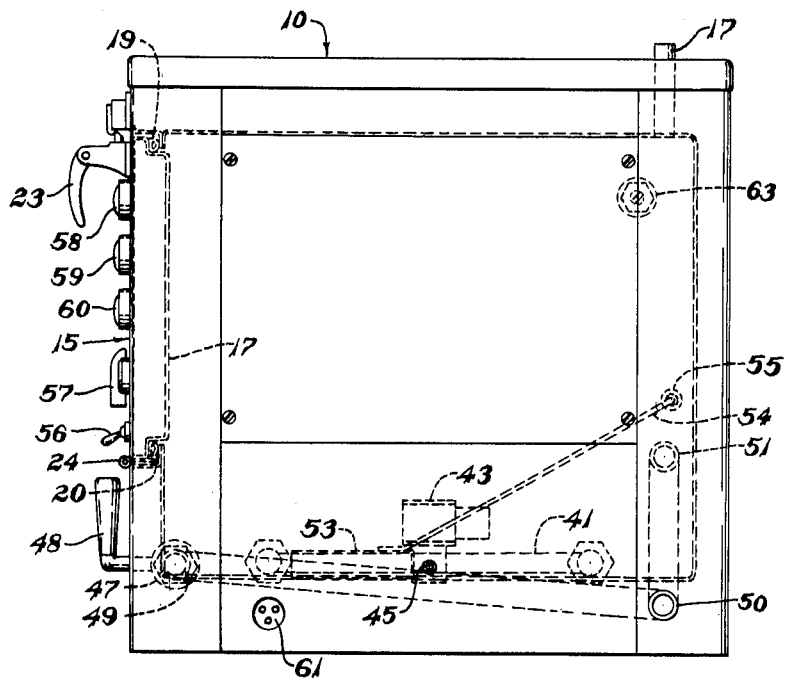
Fig. 4 is an end elevation of apparatus embodying the invention as shown in Fig. 1 with certain interior parts indicated in broken lines.

A partition 52 (see also Fig. 1) extends upwardly into the interior of the chamber 22 near the right side of the door opening 21 and extends downwardly almost to the bottom of the chamber 22. The partition 52 prevents an operator from inserting bottle carriers 35 in such position as to damage or interfere with the operation of a float 53 (Figs. 3 and 4) which is mounted on the lower end of a float arm 54 that actuates a float switch 55.

The apparatus also is equipped with a main switch 56, a timer reset switch 57 and three indicating lights 58 for "Fill," 59 for "Sterilize" and 60 for "Cool." It will be observed that by reason of placing all of the control mechanism at the right end of the cabinet all of the control and indicating elements are grouped conveniently together. Of course, audible signals may be substituted for or used in addition to the visual signals afforded by the lamps 58, 59 and 60.

Power is introduced into the device through a three connector socket 61 and in the compartment 44 at the right end of the housing there also is located a clock driven timer 62 (Fig. 5) controlled by the timer starting switch 57. A thermostat 63 (see also Fig. 4) extends into the interior of the chamber 22 where it is responsive to the temperature of the air in the chamber.

CYCLE OF OPERATIONS

In order to initiate a cycle of operations after formula bottles have been filled, nippled and capped and placed in the interior of the chamber 22 as described above, the operator throws the handle 48 to close the outlet or drain valve 47. He then resets the timer knob 57 and closes the main switch 56 to initiate a cycle. Closing the main switch 56 (see Fig. 5) allows current to flow through a line 64 to a terminal block 65, then through the normally closed contacts 66 of the float switch 55 to a terminal block 67 and through a line 68 to the inlet valve 43 and a terminal block 69 and through the switch 56 again to the other side of the line. The energization of the inlet valve 43 opens this valve allowing water at room temperature to enter through the inlet pipe 46. Concurrently therewith current flows from the connector block 67 through a line 70 to the "Fill" lamp 58 and from the "Fill" lamp 58 through a lead 71 to a terminal block 72 and then through a lead 73 and timer contacts 74 to a lead 75 to the terminal block 69. Illumination of the lamp 58 indicates that the filling phase of the cycle has commenced.

As water flows into the bottom of the chamber 22, the float 53 rises, swinging its arm 54 to actuate the float switch 55. When the level of the water in the chamber 22 reaches the correct height, i. e., above the heating elements 41 but beneath the level of the tray 33 (in its position indicated at 33ᵃ in Fig. 2), the float switch closes its other contact 76 causing current to flow through leads 77 to the heating element 41 and then to the terminal block 72 and to the other side of the line. Simultaneously current flows through a lead 78 to the "Sterilize" lamp 59 and from the lamp 59 through a lead 79 to the terminal block 72. Illumination of the "Sterilize" lamp 59 indicates that the heating and sterilizing cycle has commenced. Of course, when the float switch 55 closes the contacts 76, it opens its contacts 66, de-energizing the "Fill" lamp 58 and the inlet valve 43 and stopping the flow of water into the bottom of the chamber 22.

As soon as the temperature of the air within the cabinet reaches the predetermined level (between 208° and 211.5° F.), the thermostat 63 closes. This energizes the clock motor 62 through a lead 80 from the terminal block 67 to the thermostat 63 and a lead 81 to the clock motor 62, through a lead 82 to a pair of timer contacts 83 and then through a lead 84 to the terminal block 65. The clock motor maintains the conditions outlined for a period of 25 minutes to effect complete sterilization of the formula, its containing bottles and nipples and their caps. At the expiration of the 25 minute period, the clock motor actuates the timer switches opening the contacts 74 and 83 to de-energize the heating elements 41, the clock motor 62 and the "Sterilize" indicating lamp 59. This actuation also closes the timer contacts 86 and, through the lead 75 and a lead 87, energizes the "Cool" lamp 60 connected by a lead 88 to the terminal block 65. At the same time a fourth contact 89 of the timer is closed which re-energizes the inlet valve 43 by a lead 90 from the terminal block 69 to the inlet valve 43, the lead 68, the terminal block 67, a lead 91 to the contact 89 and the lead 84 to the terminal block 65. This opens the inlet valve 43 again allowing cool water to enter the bottom of the chamber 22.

The cool water flows into the pool of water at the bottom of the chamber 22, displacing the hot water already in the chamber upwardly and gradually raising the level of the water in the chamber until it contacts the bottoms of the bottles 38. The water continues to rise until it flows out of the overflow opening 51 and continues to flow, gradually reducing the temperature of the bath in the bottom of the chamber 22 and cooling the bottles 38. By thus gradually cooling the bath, the bottles are not subjected to a severe thermal shock and no breakage occurs. The overflowing opening 51 is located at a level such that the cooling water bath never rises up to where it touches the nipples of a standard 4 oz. formula bottle.

The "Cool" lamp indicates to the operator that the cycle is completed and the cooling water continues to flow until the operator opens the master switch, restoring the circuit to its starting condition. The sterilized formula may then be removed and either placed under refrigeration for storage or consumed.

After the removal of the formula, the operator opens the drain valve 47 by turning its handle 48, allowing the pool of water in the bottom of the chamber to escape and the apparatus is ready for a subsequent sterilizing cycle.

Because the air within the chamber 22 is in communication with the general atmosphere, the pressure within the chamber can never get above that of the general atmosphere and, therefore, the temperature of the air in the chamber 22 cannot go higher than the temperature of the boiling water in the pool 42. In practice, in fact, the heat loss through the walls of the cabinet and out the vent 14 prevents the temperature of the air in the chamber 22 from ever quite reaching the boiling temperature of the pool in the surrounding general atmosphere. This prevents caramelization of the formula and destruction of its vitamin and mineral constituents.

EXAMPLES

In order to test the efficacy of the process and apparatus embodying the invention, test bottles of formula were heavily inoculated with representative bacteria cultured under appropriate conditions and in accordance with standard procedures. As an example of the gram negative organisms frequently involved in enteric infection, *Escherichia coli* was selected principally because of its ease of identification and the fact that its destruction would clearly show that similar organisms would also be destroyed.

In the Staphylococcus classification tests were made employing both *Staphylococcus citreus* and *Staphylococcus albus*, these being chosen as examples or simulants of the toxin producing Staphylococcus and as being readily identifiable and readily obtainable.

Of the non-pathogenic types of bacteria and in order to determine the effect of the process and apparatus upon spore forming bacteria the organism *Bacillus globigii* was selected for test. It is known that the spores of this bacteria are relatively heat resistant.

*Example 1*

An infant formula consisting of 6 oz. of evaporated milk, 15 oz. of water and 4 tablespoonsful of "Dextro-Maltose" (an infant formulization prepared by The Meade Corporation and utilized merely as an example) was prepared. Ten 4 oz. portions of this formula were inoculated with a heavy suspension of *Escherichia coli* in order of about 500,000,000/cm.². The inoculated 4 oz. portions were capped with conventional nipples that also had been contaminated with the bacterial suspension and glass covers were placed on the bottles in such a manner that the nipples were not sealed off from the atmosphere.

The ten capped bottles were placed in an apparatus embodying the invention and operated in accordance with the process of the invention. The inner chamber temperature reached 211.5° F. in 18 minutes and, in this instance, was kept at that temperature for 15 minutes. The coolant was introduced into the bath and the cooling period lasted 15 minutes. During cooling the pressure within the nipple caps caused them to rather tightly contract on the nipples. After cooling the ten formula bottles were removed from the apparatus and five were placed under refrigeration; the other five being maintained at normal room temperature.

After 2 hours a 1cc. sample was removed from each of the ten bottles. These samples were tested for sterility using the conventional plate method. After twelve hours and again after 24 hours from the time of the completion of sterilization cycle, similar 1 cc. samples were removed from each of the bottles and similarly tested. All of the 30 test plates were held for 72 hours under proper conditions and at the end of this time were examined under a microscope by a trained bacteriologist who found no evidence of bacterial growth.

*Example 2*

A formula prepared as set forth in Example 1 similarly was divided in ten 4 oz. portions and, in this instance, inoculated with a suspension of *Staphylococcus albus*, again in the order of 500,000,000/cm.². The procedure outlined in Example 1 was carried out with the samples being removed at the same intervals after completion of sterilization and the plates again being maintained for 72 hours after which they were microscopically examined. As in the case of the specimens of Example 1, those of Example 2 showed no evidence of bacterial growth after the expiration of this test period.

(Note: The tests of Examples 1 and 2 were repeated upon three successive days and all plates thus prepared were kept for the same period of 72 hours. In no case was there any evidence of bacterial growth.)

*Example 3*

Samples of formula were prepared in a manner identical with that described in Example 1 and, in this instance, inoculated with *Bacillus globigii*. Again the formula was treated in accordance with the process embodying the invention and again, upon test and examination was found to be safely free of any micro-organisms.

Having described our invention, we claim:

1. Apparatus for the terminal sterilization of infants' formula in feeding bottles that comprises an insulated chamber, a vent from said chamber to the atmosphere, means for supporting such bottles in said chamber spaced from the bottom thereof, an inlet valve for introducing water into the bottom of said chamber for forming a pool therein, means in said chamber below the level of such pool for heating such water to active boiling means responsive to the level of the water in such pool for closing said inlet valve when the water in the pool reaches a selected level beneath the bottoms of such bottles and for energizing said heating means at that time, timer means for de-energizing said heating means after a selected period of time, means responsive to the temperature of atmosphere in said chamber for initiating the operation of said timer means, means also actuated by said timer means for re-opening said inlet valve, and an overflow located at a level higher than the bottoms of such bottles but beneath the level of the caps and nipples of such bottles.

2. Control mechanism for a terminal sterilizer for infant formula in capped feeding bottles, said sterilizer having an insulated chamber, means for supporting bottles in said chamber spaced from the bottom thereof, means for holding a pool of water in the bottom of said chamber and heating means for such water, said control mechanism comprising in combination, a water inlet valve, a float switch for closing said inlet valve and energizing said heating means when the water reaches a predetermined level beneath the bottom of such bottles, a timer for de-energizing said heating element and re-opening said inlet valve after the lapse of a period of time following the actuation of said timer, means responsive to the temperature of the atmosphere inside of said chamber for actuating said timer when the temperature of such inside atmosphere reaches a point a few degrees below the boiling point of water in the atmosphere outside said chamber, open vent means from the interior of said chamber to the outside thereon and an overflow pipe located in said chamber at a level above the bottom of such bottles.

3. A process for the terminal sterilization of infants' feeding bottles, formula contained therein and caps thereon, said process comprising, placing said capped, filled bottles in upright position in a sterilizing zone in a spatially isolated atmosphere that is vented to the general atmosphere whereby the pressure in said spatially isolated atmosphere cannot rise above the pressure of the general atmosphere, establishing a pool of water in the bottom of said sterilizing zone out of contact with said bottles, heating said pool of water to raise the temperature thereof to active boiling, sterilizing the bottles, the caps thereon and the formula therein by heat from steam generated from the actively boiling water pool, discontinuing the application of heat to the water pool, raising the level of the water pool by adding cool water to the pool, maintaining the water pool at a level below the level of the caps on the bottles while continuing to add cool water to the pool for slowly cooling the formula and the bottles.

4. A process for the terminal sterilization of infants' feeding bottles, formula contained therein and nipples thereon, said process comprising, placing said bottles having nipples thereon and formula therein in upright position in a sterilizing zone in a spatially isolated atmosphere that is vented to the general atmosphere whereby the pressure in said spatially isolated atmosphere cannot rise above the pressure of the general atmosphere, establishing a pool of water in the bottom of said sterilizing zone out of contact with said bottles, heating said pool of water to raise the temperature thereof to active boiling, sterilizing the bottles, the nipples thereon and the formula therein by heat from steam generated from the actively boiling water pool, discontinuing the application of heat to the water pool, raising the level of the water pool by adding cool water to the pool to cool the bottles and the formula therein, maintaining the water pool at a level below the level of the nipples on the bottles and discharging the water from the pool to reduce the pool to a level below the bottles and removing the bottles from the sterilizing zone.

References Cited in the file of this patent

UNITED STATES PATENTS

| | | |
|---|---|---|
| 1,385,630 | Luhrmann | July 26, 1921 |
| 2,321,235 | Olson | June 8, 1943 |
| 2,472,970 | Hanna | June 14, 1949 |
| 2,513,577 | Malme | July 4, 1950 |
| 2,623,449 | Losee | Dec. 30, 1952 |
| 2,624,266 | Colburn et al. | Jan. 6, 1953 |